June 10, 1952 A. C. GRIMM ET AL 2,599,629

ELECTRON DISCHARGE DEVICE AND ASSOCIATED CIRCUIT

Filed Oct. 30, 1948

INVENTORS
ALBERT C. GRIMM
ARTHUR P. SWEET, JR.
BY William A. Zalesak
ATTORNEY

Patented June 10, 1952

2,599,629

UNITED STATES PATENT OFFICE 2,599,629

ELECTRON DISCHARGE DEVICE AND ASSOCIATED CIRCUIT

Albert C. Grimm and Arthur P. Sweet, Jr., Lancaster, Pa., assignors to Radio Corporation of America, a corporation of Delaware Application October 30, 1948, Serial No. 57,594

23 Claims. (Cl. 313—299)

This invention relates to electron discharge devices and associated circuits and, more particularly, to such devices and circuits incorporating means for minimizing the effects of oscillations incident to operation thereof and useful in deflection circuits for cathode ray tubes in television receivers.

In television receivers, for example, impaired quality of the received picture has been traced to generation of oscillations in the deflection circuit tube, which will be referred to as the deflection tube. Inadequate damping of the primary circuit of the coupling transformer between the deflection tube and the deflection coil of the cathode ray tube allows that circuit to oscillate at its resonant frequency for a portion of the scansion period. Such oscillation of the primary circuit may be of sufficient magnitude to drive the potential of the deflection tube anode sufficiently negative with respect to the screen grid potential that high frequency oscillations, presumably of the Barkhausen-Kurtz type, are generated within the tube. In present practice such oscillations are of such frequencies as to produce objectionable interference in one or more of the channels of the associated television receiver.

It is an object of the present invention to provide improved electron discharge devices or tubes and associated circuits of the kind described in which the generation of undesirable oscillation is prevented or greatly minimized.

Another object of the invention is to provide an improved beam tube structure.

A further object is to devise a novel method of suppressing spurious oscillations in a cathode ray tube deflection system.

In accordance with the present invention, the electrons within the anode-screen grid space of the tube are deflected from their normal paths so that they do not oscillate about the screen grid, or if they do, their transit time is so altered during each excursion that the oscillatory energy is thinly distributed over a wide range of frequencies rather than being concentrated in one or other small number of frequencies of high energy content.

More particularly, in one form of the invention, there is maintained between the beam-forming electrodes of the tube a unidirectional voltage of magnitude effective more or less completely to suppress generation of oscillations within the tube. More specifically, one of the beam-forming electrodes may be at cathode potential and the other of said electrodes is biased to a suitable extent positive or negative with respect to the cathode, preferably the latter, because affording the greater power output.

In another form of the invention, auxiliary electrode structure of rod or strip-like form is disposed between the beam-forming electrodes and maintained at such unidirectional potential with respect to them that oscillations within the tube are suppressed. The auxiliary electrode structure may connect to a tube terminal for connection to an external biasing source, preferably so poled that the direct current potential of the auxiliary electrode is positive with respect to the beam-forming electrodes. Preferably, however, the auxiliary electrode is connected internally to the anode of the tube.

The invention further resides in methods and arrangements having features of novelty hereinafter described and claimed.

For a more detailed understanding of the invention and for illustration of tubes and tube circuits embodying it, reference is made to the accompanying drawings in which.

Figure 1:
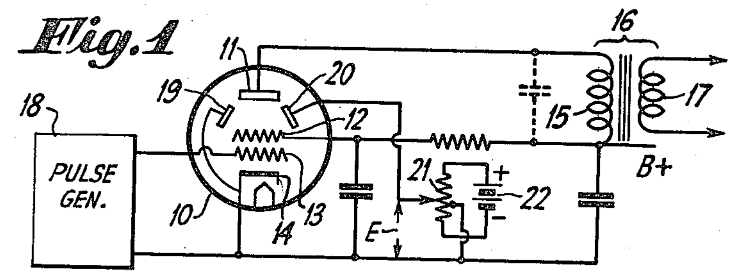
Fig. 1 is a schematic view of a cathode ray tube deflection circuit embodying one form of my invention.

Referring to Fig. 1, the tube 10 is a tetrode having the usual anode 11, screen grid 12, control grid 13 and cathode 14. The anode circuit of tube 10 includes the primary 15 of a coupling transformer 16 whose secondary 17 supplies current to the deflection coil of a cathode ray tube (not shown).

The pulse or sweep generator 18 is connected in the control grid circuit of the deflection tube 10 to apply thereto a waveform of suitable shape and repetition frequency, all as well known in the art. In general, in each scansion period, the control grid voltage becomes less and less negative or more positive as a linear function of time so that the beam of the cathode ray tube sweeps across the screen. Near the end of the scansion period, the control grid voltage abruptly returns to its original value and the cathode ray beam rapidly retraces its path back to the original position.

During that portion of each scansion period corresponding with the retrace time, the tube 10 is operating at or below cut-off so that the primary circuit of the coupling transformer is inadequately damped. In consequence, the primary circuit oscillates at its natural resonant period, causing at least several wide excursions of the potential of anode 11 from high positive to high negative values. During such excursions, the anode potential may be driven far enough below the potential of the screen grid 12 so that there exists in the screen-anode space of the tube for a period of time a negative voltage gradient favorable for generation of Barkhausen-Kurtz oscillations. Such oscillations are of high frequency and may, and often do, fall within one or more of the channels assigned to television services. In consequency, these oscillations are picked up by the high-frequency amplifying circuits of the associated television receiver and appear as objectionable bright spots or lines in the received picture.

In the particular arrangement shown in Fig. 1, such oscillations or their objectionable effects are either eliminated or substantially minimized by maintaining a suitable difference of potential between the beam-forming electrodes 19 and 20 of tube 10. The transverse electric field thus produced deflects at least a part of the electrons out of the screen-anode space, and/or varies the electron transit time. As shown, one of the beam-forming electrodes is connected internally to the cathode 14 and the other of the beam-forming electrodes is connected through the source of biasing voltage to the cathode. With the deflection tube 10 similar to a 6BG6G, except in respects herein discussed, the Barkhausen-Kurtz oscillations are suppressed for ranges of positive and negative values of voltage E. The center-tapped potential divider 21 connected across a source of unidirectional voltage generally represented by battery 22 provides for selection of a proper magnitude of negative or positive biasing voltage. Preferably, the source of voltage E is so poled that the potential of electrode 20 is negative with respect to electrode 19 as it was found this poling afforded the larger power output. With this arrangement, unlike others later described, the magnitude of voltage E effective to suppress the Barkhausen-Kurtz oscillations is dependent upon the potentials applied to other electrodes of the tube, and provision is made for adjustment of voltage E from about minus 50 volts to about minus 200 volts.

Figure 2:
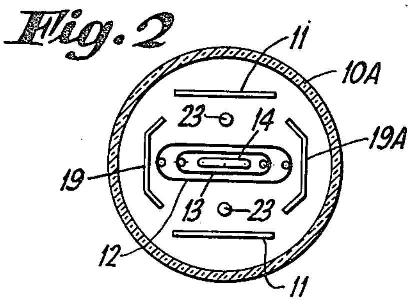
Fig. 2 is a plan view of the internal electrode arrangement of an improved tube embodying the invention.
Figure 3:
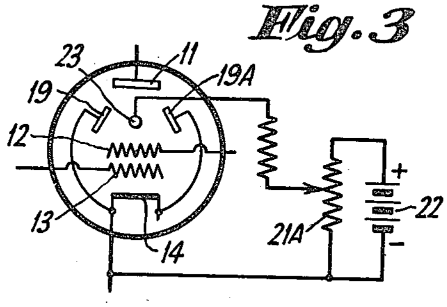
Fig. 3 is a schematic view of an oscillation-suppression circuit incorporating the tube of Fig. 2.

When there is substituted for tube 10 of Fig. 1 a tube 10A having the electrode arrangement shown in Fig. 2, the magnitude of bias voltage necessary for suppression of Barkhausen-Kurtz oscillations is independent of the potentials applied to the other tube electrodes over a normal operating range. In tube 10A, the beam-forming electrodes 19 and 19A are both connected to the cathode 14 as shown in Fig. 3 and between the beam-forming electrodes 19, 19A there are disposed, in the screen-anode space of the tube, one or more auxiliary electrodes 23 in the form of a rod or strip. A lead from this auxiliary electrode structure is brought to a separate terminal of the tube for connection to a source of unidirectional biasing voltage represented in Fig. 3 by battery 22, to produce an electric field between the auxiliary electrode structure and each beam-forming electrode. For a tube otherwise similar to a 6BG6G the optimum magnitude of the biasing voltage for effective suppression of spurious oscillations was from about 50 to about 75 volts positive with respect to cathode 14.

Figure 4:
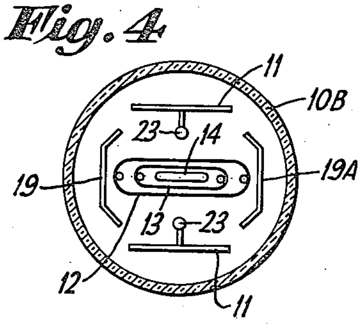
Fig. 4 is a plan view of the electrode arrangement of another tube embodying the invention.
Figure 5:
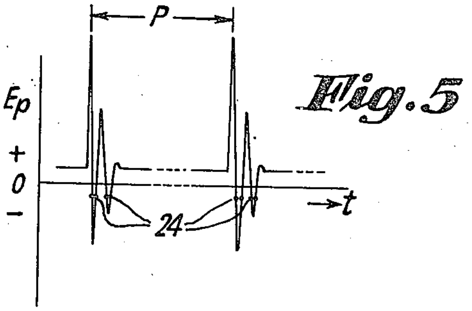
Fig. 5 is an explanatory figure referred to in the explanation of the operation of the tube of Fig. 4.

In the modification shown in Fig. 4, the relative positions of the electrodes including the auxiliary electrodes 23 is the same as that shown in Fig. 2 but the auxiliary electrodes 23, 23 are connected internally of the tube directly to the adjacent anode elements 11, 11. Thus, the potential difference between the auxiliary electrodes 23 and the beam-forming electrodes 19 and 19A is the plate to cathode potential. During oscillation of the primary circuit of the coupling transformer, the auxiliary electrode structure receives a large negative potential with respect to the beam-forming electrodes during the time when the spurious oscillations would normally occur which produces transverse deflecting fields in the screen-anode space, and hence, the oscillations are either suppressed or their energy so thinly distributed over a wide portion of the frequency spectrum that no objectionable disturbance appears in the presentation of the cathode ray tube. As shown in Fig. 5, the potential of the anode 11 and the auxiliary electrode structure 23 swings from a high positive to a substantial negative potential in each scansion period P, the dots 24 indicating the time at which the spurious oscillations would occur except for the effect of the auxiliary electrodes upon electrons in the screen-anode region or regions of the tube.

Figure 6:
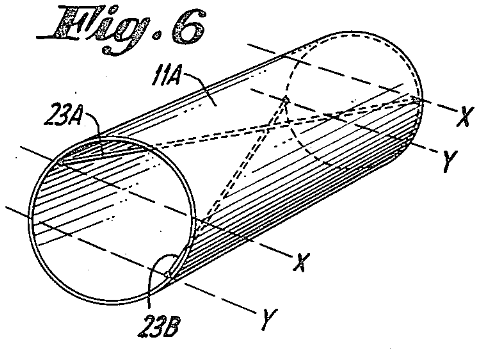
Fig. 6 is a perspective view of the composite anode and auxiliary electrode structure of a modification of Fig. 4.
Figure 8:
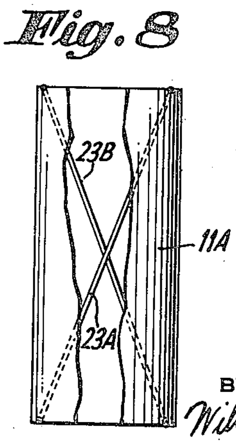
Fig. 8 is a front elevational view of Fig. 7, in part broken away to show the auxiliary electrode structure.
Figure 7:
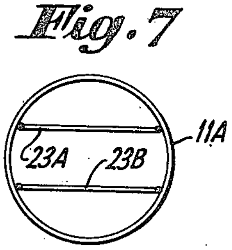
Fig. 7 is a plan view of the electrode structure shown in Fig. 6.

In tubes 10A and 10B, the strip or rod electrodes 23, 23 may be parallel with each other. A preferred arrangement, however, is shown in Figs. 6 to 8. In this construction, the anode 11*a* is cylindrical and the auxiliary electrodes 23A and 23B, in the form of wires or thin rods 23A and 23B, respectively, lie in parallel planes X, X and Y, Y intersecting the cylindrical anode 11A adjacent the opposite sides of the beam-forming electrodes. The opposite ends of each rod or wire are connected to points on the anode which are spaced axially and circumferentially thereof. As viewed in Fig. 8, the two auxiliary electrodes form a cross with their upper ends connected, as by welding, to the cylindrical anode at or near the upper edge thereof and their lower ends transposed and connected to the anode at or near the lower edge thereof. The other electrodes of the tube are axially disposed within the cylindrical anode between the auxiliary electrodes, as in Fig. 4. Thus, as in preceding modifications, the auxiliary electrodes are disposed in the space bounded by the anode, screen and beam-forming electrodes, and are effective to so alter the normal paths of electrons in that space that potential gradients favorable to generation of Barkhausen-Kurtz oscillations either do not exist or are so varied during excursions of the electrons that any oscillatory energy produced is not concentrated at one or two discrete frequencies but is widely and thinly scattered in the frequency spectrum.

It shall be understood the invention is not limited to specific embodiments illustrated for purposes of explanation and that changes and modifications may be made within the scope of the appended claims.

What is claimed is:

1. In a cathode ray tube deflection system including a deflection tube having a cathode, screen grid and anode defining a straight electron beam path, and a reactance connected to said anode; the method of minimizing spurious oscillations generated within said deflection tube during oscillation of said reactance at its resonant frequency which comprises producing an electric field transverse to said beam path in the space between said screen grid and said anode and of sufficient magnitude to deflect at least a part of the electrons out of said space.

2. In a cathode ray tube deflection system including a deflection tube having a cathode, screen grid and anode defining a straight electron beam path, and a coupling transformer having its primary winding connected to said anode; the method of minimizing spurious oscillations generated within said deflection tube during oscillation of said primary winding at its resonant frequency which comprises producing an electric field transverse to said beam path in the space between said screen grid and said anode and of sufficient magnitude to deflect at least a part of the electrons out of said space.

3. A cathode ray tube deflection system comprising a beam tube having a screen grid and an anode, a reactance connected to said anode, and means for suppressing spurious oscillations generated within said beam tube during oscillation of said reactance at its resonant frequency comprising at least two electrodes disposed between said anode and said screen grid and spaced apart transversely of the beam path therebetween, and means for producing a potential difference between said electrodes to produce a transverse electric field materially altering the paths of electrons along said path.

4. A cathode ray tube deflection system comprising a deflection tube having an anode, a screen grid and beam-forming electrodes, a coupling transformer having its primary winding connected to said anode, and means for suppressing spurious oscillations generated within said deflection tube during oscilation of said primary winding at its resonant frequency comprising a source of unidirectional biasing voltage connected between said beam-forming electrodes and of magnitude altering the path of electrons in the space between said anode and said screen grid.

5. A cathode ray tube deflection system comprising a deflection tube having an anode, a screen grid, a cathode and beam-forming electrodes one of which is connected to said cathode, a coupling transformer having its primary winding connected to said anode, and means for suppressing spurious oscillations generated within said deflection tube during oscillation of said primary winding at its resonant frequency comprising a source of unidirectional biasing voltage connected between the other of said beam-forming electrodes and said cathode and of magnitude altering the paths of electrons in the space between said anode and said screen grid.

6. A cathode ray tube deflection system comprising a beam tube having a screen grid and an anode, a coupling transformer having its primary winding connected to said anode, and means for suppressing spurious oscillations generated within said beam tube during oscillation of said primary winding at its resonant frequency comprising at least two electrodes disposed between said anode and said screen grid and spaced apart transversely of the beam path therebetween, and means for producing a potential difference between said electrodes to produce a transverse electric field materially altering the paths of electrons along said path.

7. A cathode ray tube deflection system comprising a deflection tube having an anode, a screen grid, a cathode and beam-forming electrodes connected to said cathode, a coupling transformer having its primary winding connected to said anode, and means for suppressing spurious oscillations generated within said deflection tube during oscillation of said primary winding at its resonant frequency comprising auxiliary electrode structure disposed in a space bounded by said anode, said screen grid and said beam-forming electrode, and an external source of unidirectional voltage connected between said cathode and said auxiliary electrode structure to maintain the latter at a potential relative to said beam-forming electrodes altering the paths of electrons in said space.

8. A cathode ray tube deflection system comprising a deflection tube having an anode, a screen grid, a cathode and beam-forming electrodes connected to said cathode, a coupling transformer having its primary winding connected to said anode, and means for suppressing spurious oscillations generated within said deflection tube during oscillation of said primary winding at its resonant frequency comprising auxiliary electrode structure disposed in a space bounded by said anode, said screen-grid and said beam-forming electrodes, and connected means within said deflection tube between said anode and said auxiliary electrode structure.

9. A beam tube having a cathode, a control grid, a screen grid, an anode, beam-forming electrodes on opposite sides of the beam path between said screen grid and said anode, and auxiliary electrode structure for suppression of Barkhausen-Kurtz oscillations and disposed in the space bounded by said anode, said screen grid and said beam-forming electrodes.

10. A beam tube having a cathode, a control grid, a screen grid, an anode, beam-forming electrodes, auxiliary electrode structure disposed in the space bounded by said anode, said screen grid and said beam-forming electrodes for suppression of Barkhausen-Kurtz oscillations, and tube terminals including a separate terminal connected to said auxiliary electrode structure for application of a biasing potential thereto.

11. A beam tube having an anode, a screen grid, beam-forming electrodes, auxiliary electrode structure disposed in the space bounded by said anode, said screen grid and said beam-forming electrodes, and a connection internally of said tube from said auxiliary electrode structure to said anode to provide a potential gradient in said space unfavorable to generation of Barkhausen-Kurtz oscillations at discrete frequencies.

12. A beam tube having a cylindrical anode, a screen grid, beam-forming electrodes, and a pair of thin rods or strips each connected at its ends to said cylindrical anode at points spaced axially and circumferentially thereof, said rods lying parallel planes on opposite sides of said screen grid and forming auxiliary electrodes effective in suppression of Barkhausen-Kurtz oscillations.

13. Composite electrode structure for a beam-deflection tube comprising a cylindrical anode, and a pair of thin rods each connected at its opposite ends to said anode at points spaced axially and circumferentially thereof, the ends of said rods being transposed at opposite ends of the anode.

14. An electrical device comprising a cathode, a screen grid and an anode defining a normally-straight beam path, beam-forming electrodes disposed on opposite sides of the beam path between said screen grid and said anode, and means including at least one of said beam-forming electrodes for establishing a relatively-weak electric deflecting field transverse to said beam path, for deflecting at least a part of the electrons of the beam out of said beam path when the potential of said anode drops below a given value during operation of said device.

15. An electrical device according to claim 14, including means connecting at least one of said beam-forming electrodes directly to said cathode.

16. An electrical device according to claim 14, wherein said means includes a source of unidirectional biasing voltage connected across said beam-forming electrodes.

17. An electrical device comprising a cathode, a screen grid and an anode defining a beam path, beam-forming electrodes disposed on opposite sides of the beam path between said screen grid and said anode, and means, including at least one of said beam-forming electrodes and an auxiliary electrode structure disposed between said beam-forming electrodes, for establishing an electric deflecting field transverse to said beam path.

18. An electrical device according to claim 17, including means connecting said beam-forming electrodes directly to said cathode.

19. An electrical device according to claim 17, wherein said means further includes a source of unidirectional voltage connected across said beam-forming electrodes and said auxiliary electrode structure.

20. An electrical device according to claim 17, wherein said means further includes means connecting said auxiliary electrode structure to said anode.

21. An electrical device comprising a cathode, a screen grid and an anode defining a beam path, at least two deflecting electrodes disposed between said screen grid and said anode and spaced apart transversely of the beam path therebetween, one of said electrodes being connected directly to said cathode, and means for establishing a potential difference between said cathode and another of said electrodes, to establish a deflecting electric field between said electrodes and transverse to said beam path.

22. A beam tube having a cathode, a screen grid and an anode defining a beam path, at least two deflecting electrodes disposed between said screen grid and said anode and spaced apart transversely of the beam path therebetween, one of said electrodes being connected internally of said tube to said cathode, and tube terminals including a separate terminal connected to another of said electrodes for application of a biasing potential thereto.

23. A beam tube having a cathode, a screen grid and an anode defining a beam path, and at least two electrodes disposed between said screen grid and said anode and spaced apart transversely of the beam path therebetween, one of said electrodes being connected internally of said tube to said cathode, another of said electrodes being connected internally of said tube to said anode.

ALBERT C. GRIMM.
ARTHUR P. SWEET, JR.

REFERENCES CITED

The following references are of record in the file of this patent:

UNITED STATES PATENTS

| Number | Name | Date |
|---|---|---|
| 2,172,316 | Bowie | Sept. 5, 1939 |
| 2,272,232 | Wagner | July 31, 1940 |
| 2,293,418 | Wagner | Sept. 27, 1940 |
| 2,254,095 | Thompson | Aug. 26, 1941 |